United States Patent [19]

Bellanger et al.

[11] 4,312,062
[45] * Jan. 19, 1982

[54] SYSTEM FOR DIGITALLY CONVERTING BASEBAND CHANNEL SIGNALS INTO A FREQUENCY-DIVISION MULTIPLEX SIGNAL AND VICE VERSA

[75] Inventors: Maurice G. Bellanger, Antony; Jacques L. Daguet, St. Maur des Fosses, both of France

[73] Assignee: Telecommunications Radioelectriques et Telephoniques, Paris, France

[*] Notice: The portion of the term of this patent subsequent to Nov. 19, 1995, has been disclaimed.

[21] Appl. No.: 588,854

[22] Filed: Jun. 20, 1975

[30] Foreign Application Priority Data

Jun. 28, 1974 [FR] France .................. 74 22641

[51] Int. Cl.³ .............................. H04J 1/00
[52] U.S. Cl. ............................ 370/50; 370/70
[58] Field of Search ....... 179/15 FD, 15 FS, 15.55 R; 325/50, 65; 364/724, 725, 726; 370/50, 70

[56] References Cited

U.S. PATENT DOCUMENTS 3,403,227  9/1968  Malm ................. 179/1 SA
3,423,729  1/1969  Heller ................. 325/41
3,605,019  9/1971  Cutter ................ 179/15 FD Primary Examiner—Daryl W. Cook
Assistant Examiner—Joseph A. Popek
Attorney, Agent, or Firm—Thomas A. Briody; Robert T. Mayer; James J. Cannon, Jr.

[57] ABSTRACT

System for digitally converting baseband channel signals into a frequency-division multiplex signal. The system comprises at its input converter circuits by each of which the sequence of codewords of the digital signal which correspond to each signal to be converted is divided into two interlaced sequences. The two devices required for processing each of the two digital signals supplied by the input circuits in the form of converters are combined so as to use in cascade a Fourier transformation device, a set of arithmetic units in the form of digital filters and a time-division multiplexer which supplies the desired multiplex signal. Use: multiplex transmission of speech signals.

5 Claims, 11 Drawing Figures

SYSTEM FOR DIGITALLY CONVERTING BASEBAND CHANNEL SIGNALS INTO A FREQUENCY-DIVISION MULTIPLEX SIGNAL AND VICE VERSA

BACKGROUND OF THE INVENTION

1. Field of the Invention

The invention relates to a system for digitally processing a given number of analog channel signals each having a given bandwidth $\Delta f$, which system for converting the said baseband channel signals into a single-sideband frequency-division multiplex signal comprises in cascade:

(a) input circuits which are formed by converters for converting the digital signals which correspond to the analog signals to be converted into pairs of digital signals in which the codewords occur simultaneously at a frequency $\Delta f$, (b) a Fourier transformation device which is provided with N pairs of inputs and with 2 N outputs, where N at least is equal to the number of channel signals to be converted, and which is connected to a coefficient source which supplies carrier signal functions, (c) a first set of 2 N arithmetic units which is connected to a source of filter coefficients which are formed by the values of the impulse response of a low-pass filter having a cut-off frequency equal to $\Delta f/2$, which arithmetic units are in the form of digital filters which each use a given set of coefficients formed by the values of the said impulse response at instants which occur with a period $1/\Delta f$ and in each set are shifted with respect to a reference instant by a given multiple of $\frac{1}{2}N\Delta f$, (d) a series-parallel converter having 2 N inputs and one output at which a digital signal appears which corresponds to the desired multiplex signal.

Providing such a system with elements which perform reciprocal operations enables the reverse operation, i.e. the conversion of the said multiplex signal into baseband channel signals, to be performed, 2. Description of the Prior Art This system is used particularly with respect to speech signals for performing, by digital means, operations for producing a frequency-division multiplex signal and for demultiplexing this multiplex signal. Such systems are described in our prior U.S. Pat. No. 3,891,803. As is set out in this patent, an important property of the prior art device is the low computing speed of all computing circuits, for they operate on digital signals in which the codewords occur at a frequency equal to the bandwidth $\Delta f$ of a channel signal (4 kHz in the case of speech signals). This low computing speed greatly facilitates large-scale integration of the system.

While retaining this important advantage the present invention provides a new embodiment of the above-mentioned system in order to reduce the equipment required and hence the cost.

SUMMARY OF THE INVENTION

In the system for converting baseband channel signals into a frequency-division multiplex signal according to the invention each input circuit in the form of a converter is provided with means for dividing the codewords of the input signal between two circuits one of which is provided with a delay circuit, the two circuits supplying the pair of digital signals which is transmitted to a pair of inputs of the Fourier transformation device.

Output circuits of said Fourier transformation device, which are arranged symmetrically with respect to a central output of this transformation device, are connected to inputs of addition circuits the outputs of which are connected to said set of arithmetic units and also to inputs of subtraction circuits the outputs of which are connected to a second set of arithmetic units, to which second set of arithmetic units the same sets of the filter coefficients are supplied as to the first sets of arithmetic units, each pair of arithmetic units being supplied to it as sets of coefficients the values of the impulse of the low-pass filter which occur at instants which are symmetrical with respect to the reference instant, the filter coefficients supplied to the corresponding arithmetic units of the two sets being the values of the impulse response which are relatively shifted by a period of $\frac{1}{2}\Delta f$, in which system output codewords of the said corresponding arithmetic units are combined with each other for producing the digital signals which are supplied to the series-parallel converter.

In a first embodiment of the invention in which the input circuits are formed by quadrature modulators the Fourier transformation device has digital signals supplied to it in which the codewords occur at a frequency which is equal to one half of the frequency of a channel signal. The Fourier transformation device has coefficients applied to it which characterize carrier signal functions at frequencies which are equal of the low-pass filter. This Fourier transformation device is of the type which performs the conventional discrete Fourier transformation. Hereinafter it will be referred to as even Fourier transformation device, in contrast with another type which performs an odd discrete Fourier transformation and is used in another embodiment of the invention.

At the output of the system according to the first embodiment of the invention, a frequency-division multiplex signal is obtained in digital form, just as in the aforementioned U.S. patent, in a band the lowest frequency of which is an odd multiple of one half of the bandwidth of a channel signal, i.e. an odd multiple of $\Delta f/2$.

It may be of advantage for the latter frequency to be an even multiple of $\Delta f/2$, for in the case of a multiplex speech signal this facilitates the translation of the multiplex signal obtained at the output of the system to the ultimate frequency band, the lowest frequency of which always is a multiple of the bandwidth $\Delta f$ of a channel signal.

This result is obtained by a second embodiment of the invention in which the two circuits of each input circuit formed by a converter do not include the quadrature modulators which are used in the first embodiment while one Fourier transformation device has coefficients supplied to it which correspond to carrier signal frequencies which are odd multiples of the cut-off frequency of the low-pass filter. In this embodiment an odd Fourier transformation is performed, while the coefficients supplied to the arithmetic units are obtained from the aforementioned sets of coefficients by converting the sign of one of each two successive coefficients of each set. For a definition of the odd Fourier transformation as compared with the usual Fourier transformation reference is made to J. L. Vernet in "Proceedings of the IEEE" October 1971, pages 1531 and 1532.

It should be mentioned that in prior U.S. Pat. No. 3,891,803 the input circuits formed by the converters were provided with low-pass filters having the cut-off frequency $\Delta f/2$, so that Hilbert transformation devices were formed. In the present invention the input circuits formed by converters do not contain such comparatively complicated filters and hence can be simply manufactured. As will be seen hereinafter, another advantage of the present invention is due to the fact that the spectra of the signals produced by the input circuits in the form of converters are different, requiring a smaller number of coefficients for the low-pass filter which are to be supplied to the arithmetic members, so that the latter can be less complex.

A further reduction of the equipment is obtained in a preferred embodiment of the invention in which an impulse response of the low pass filter is used which has a symmetry axis, in which case the two sets of arithmetic members can be combined so that substantially the same amount of equipment is used as for a single set.

BRIEF DESCRIPTION OF THE DRAWINGS

The invention will now be described, by way of example, with reference to the accompanying diagrammatic drawings, in which.

DESCRIPTION OF THE PREFERRED EMBODIMENT

Figure 1:
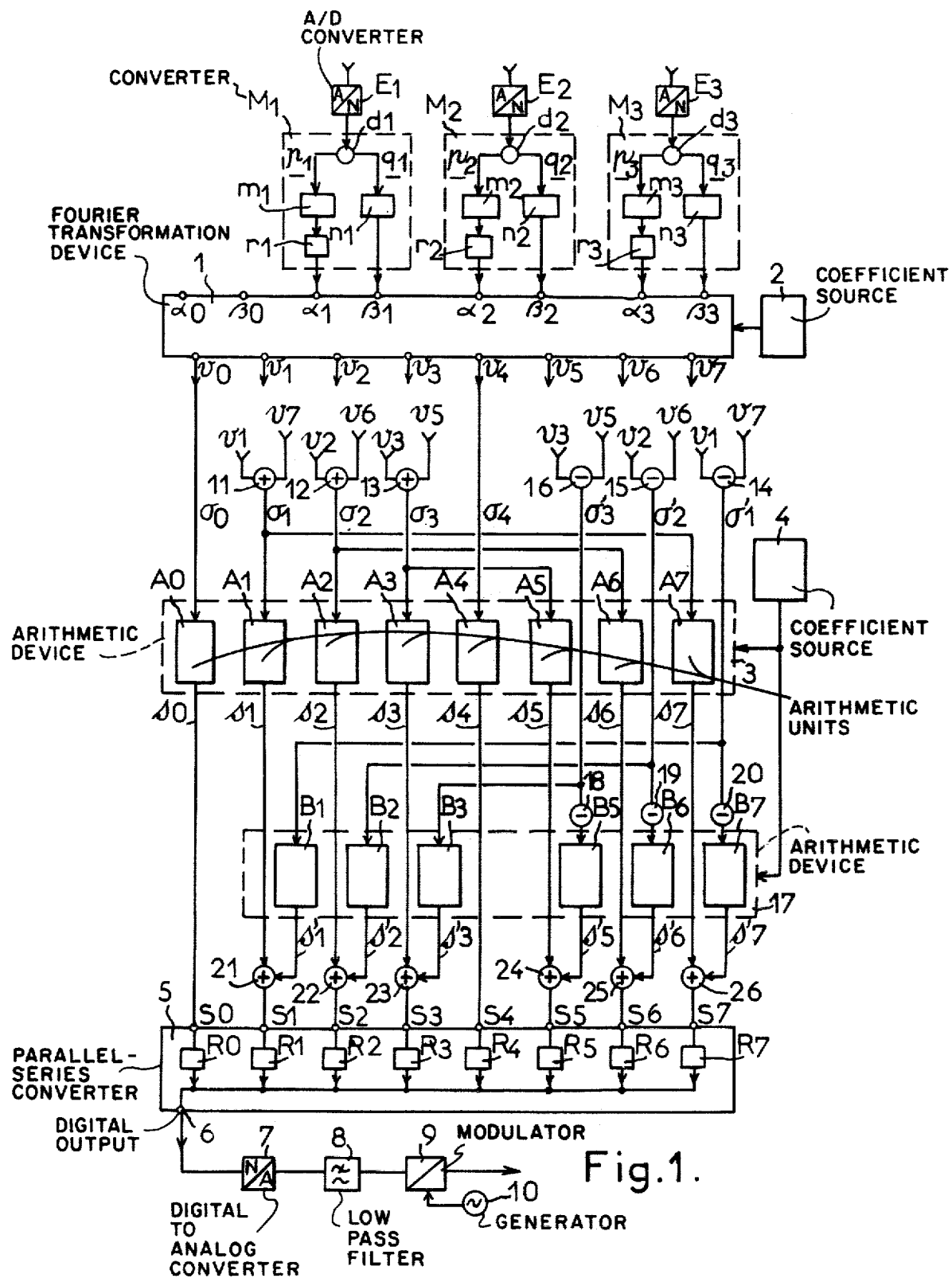
FIG. 1 is the circuit diagram of the first embodiment of the system according to the invention which is used for forming the multiplex signal.

FIG. 1 shows a system according to the invention for the case in which it is used for converting baseband channel signals into a single-sideband frequency-division multiplex signal. For simplicity, the system is shown for the case in which the number of channel signals to be converted is three, but this can readily be generalized. The signals each have a bandwidth $\Delta f$, which is equal to 4 kHz for speech signals.

The system shown in FIG. 1 comprises the cascade arrangement of elements which are equal to those of the system described in prior U.S. Pat. No. 3,891,803. More particularly the system comprises:

(a) Input circuits in the form of converters $M_1$, $M_2$ and $M_3$ the inputs of which are connected to analog-to-digital converters $E_1$, $E_2$ and $E_3$ respectively in which the three analog signals to be converted are sampled at the Nyquist frequency $2\Delta f$ and encoded. Each circuit at its two outputs produces a pair of digital signals in which the codewords occur simultaneously at a frequency $\Delta f$ equal to the bandwidth of the channel signal.

(b) A Fourier transformation device 1 provided with three pairs of inputs $(\alpha_1, \beta_1)$, $(\alpha_2, \beta_2)$, and $(\alpha_3, \beta_3)$ a pair of digital signals supplied by the circuits $M_1$, $M_2$ and $M_3$ respectively being applied to each input pair. Preferably a fast Fourier transformation device is used in which the number N of inputs is an integral power of two. Hence in FIG. 1 an idle pair of inputs $(\alpha_o, \beta_o)$ is added to obtain $N=4$ pairs of inputs. The Fourier transformation device 1 has $2N=8$ outputs designated by $V_0$ to $V_7$ and is connected to a source 2 of coefficients which correspond to carrier signal functions. According to the aforementioned U.S. Pat. No. 3,891,803, if the complex signal which corresponds to the pair of digital signals which are supplied to an input pair $(\alpha_n, \beta_n)$ of the Fourier transformation device is referred to as $X_n$, where n may assume all integral values of 0 to 3, the codewords at any output $v_i$ of this transformation device are obtained by means of the operations which are represented by the following expression:

$$\text{real part of } \sum_{n=0}^{3} X_n \cdot e^{j\frac{2\pi i n}{2N}} \tag{1}$$

The coefficient source 2 provides the various values of the complex e-power exp $[j\cdot 2\pi in/2N]$, where i is an integer from 0 to 7 and n is an integer from 0 to 3.

If this complex e-power is written in the form $$e^{j 2\pi \cdot (2n\frac{\Delta f}{2})\cdot \frac{i}{2N\Delta f}}$$

it will be seen that the coefficients from the source 2 can be considered as the values at instants $$\frac{i}{2Nf}$$

of carrier signals of frequency $2n\cdot\Delta f/2$, that is to say frequencies which are even multiples of the frequency $\Delta f/2$.

For this reason the Fourier transformation device which is used in prior U.S. Pat. No. 3,891,803 and which is the usual device will hereinafter be referred to as even Fourier transformation device, while the operation it performs will be referred to as even discrete Fourier transformation.

(c) The system further includes a set 3 of $2N=8$ arithmetic units $A_0$ to $A_7$ the inputs of which are connected to the outputs $v_0$ to $v_7$ of the Fourier transformation device. The said set of arithmetic units is connected to a source 4 of coefficients which are discrete values of the impulse response of a low-pass filter having a cut-off frequency $\Delta f/2$. These arithmetic units $A_0$ to $A_7$ take the form of digital filters which may be of the non-recursive type, as described in U.S. Pat. No. 3,891,803 or of the recursive type as described in French patent application No. 7,342,527. In the non-recursive form of these arithmetic units each output codeword is the sum of a given number of input codewords multiplied by a set of given coefficients. For a better understanding of the following, the set of coefficients used in each arithmetic unit will be set out in more detail.

For this purpose FIG. 2a shows the impulse response of the low-pass filter having the cut-off frequency $\Delta f/2$. This response is a maximum at the reference instant $t=0$ and becomes zero at each instant which is equal to a multiple other than zero of the interval $1/\Delta f$.

In the diagram shown in FIG. 2a the impulse response is restricted to 2P intervals $1/\Delta f$ which are also distributed about the instant $t=0$, each interval $1/\Delta f$ being characterized by a parameter k, where k is an integer which on one side of the origin varies from $-P$ to $-1$ and on the other side of the origin varies from 0 to $(P-1)$.

The coefficients used in the arithmetic units $A_0$ to $A_7$ are the values of the impulse response of FIG. 2a which are obtained by sampling this impulse response with a train of sampling pulses which occur with a period $1/\Delta f$. The coefficients supplied to the various arithmetic units $A_0$, $A_1$, $A_2$, . . . , $A_7$ are obtained by sampling the impulse response shown in FIG. 2a with trains of sampling pulses in which the pulses occur with a period $1/\Delta f$ and which with respect to the sampling pulses which supply the coefficients for $A_0$ are shifted by time intervals 0, $\frac{1}{8}\Delta f$, $-2/8\Delta f$, . . . , $-\frac{7}{8}\Delta f$ respectively. By assuming $\frac{1}{8}f=T$ the sets of coefficients supplied to the arithmetic units $A_0$, $A_1$, $A_2$, . . . , $A_7$ can be represented by $a^k(0)$, $a^k(-T)$, $a^k(-2T)$, . . . , $a^k(-7T)$ respectively. This is shown by the time diagrams of FIGS. 2c to 2j.

An arithmetic unit $A_i$ of non-recursive form to the input of which the codewords $v_i^k$ are applied and which uses the set of coefficients $a^k(-iT)$ supplies output codewords given by the expression:

$$\sum_{k=-P}^{P-1} v_i^k \cdot a^k(-iT) \qquad (2)$$

These codewords occur at the frequency $\Delta f$ simultaneously for all the arithmetic units $A_0$ to $A_7$.

When the arithmetic units are constructed in recursive form, as described in prior French patent application No. 7,342,527, their non-recursive portions which correspond to the numerator of the function h(z) also perform the computation given by the expression (2).

(d) Similarly to the system described in prior U.S. Pat. No. 3,891,803 the system further comprises a series-parallel converter 5 having 2 N inputs $S_0$ to $S_7$ which according to the said prior application are directly connected to the outputs of the arithmetic units $A_0$ to $A_7$ respectively of the device 3. The converter 5 converts the eight digital signals supplied by the device 3 to a time-division multiplex signal by means of delay circuits $R_0$, $R_1$, . . . , $R_7$ having delay times 0, T, . . . , 7T respectively. Thus at an output 6 of the converter 5 a digital signal is obtained which at a sampling frequency equal to $8\Delta f$ represents the single-sideband frequency-division multiplex signal which comprises the three signals of bandwidth $\Delta f$ applied to the input of the system, the said multiplex signal being situated in the frequency band which extends from $\Delta f/2$ to $(\Delta f/2+3\Delta f)$. After being converted in an digital-to-analog converter 7 and being filtered in a low-pass filter 8 the said multiplex signal is obtained in analog form. It then is transposed to the desired frequency band by means of a modulator 9 to which a generator 10 supplies a carrier signal of suitable frequency.

Figure 3:
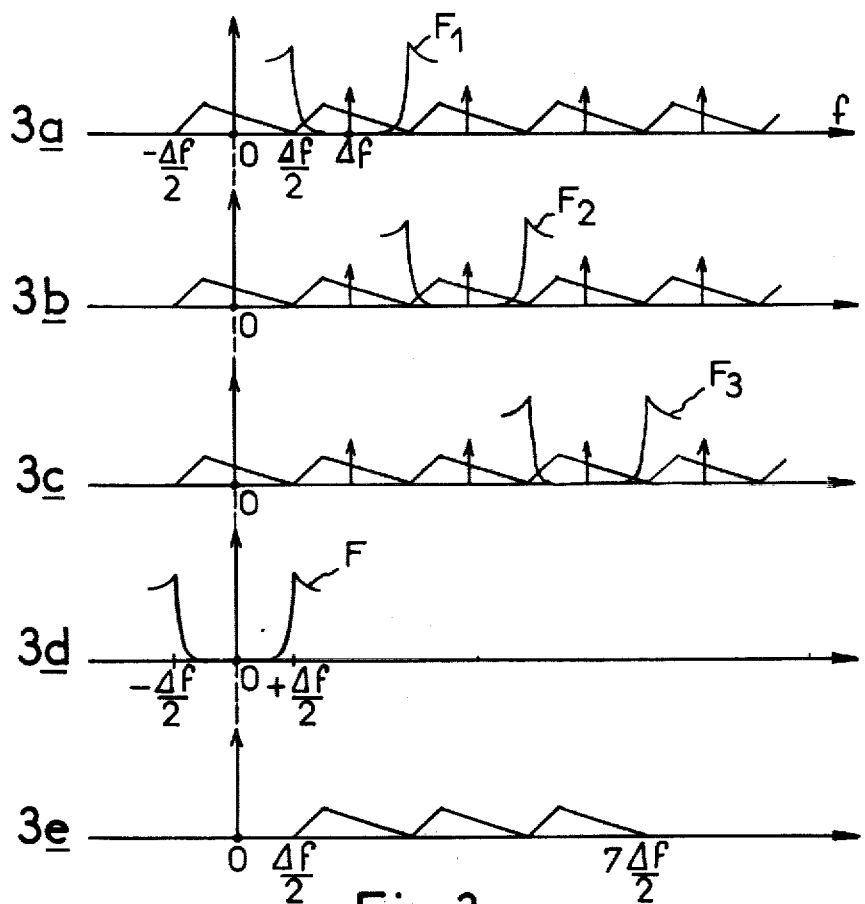
FIG. 3 shows the shapes of the spectra of the signals in the system.

The input circuits $M_1$, $M_2$ and $M_3$ described in prior U.S. Pat. No. 3,891,803 are in the form of digital Hilbert transformation devices having two outputs. These Hilbert transformation devices together supply with a sampling frequency equal to $1/\Delta f$, a complex signal which corresponds to the input signals and lies in the frequency band from $-\Delta f/2$ to $+\Delta f/2$. The spectra of these complex signals all have the same form and are shown in diagrams 3a, 3b and 3c of FIG. 3. To obtain such spectra the circuits $M_1$, $M_2$ and $M_3$ are provided with digital low-pass filters having a cut-off frequency $\Delta f/2$.

The operations which in the system according to prior U.S. Pat. No. 3,891,803 had to be performed on the three complex signals are equivalent to filtering each of these signals by means of filters having attenuation curves $F_1$, $F_2$ and $F_3$ shown in FIGS. 3a, 3b and 3c respectively. These characteristic curves $F_1$, $F_2$ and $F_3$ were obtained by shifting the characteristic F curve of the low-pass filter illustrated in FIG. 3d through the frequency distances $2\Delta f/2$, $4\Delta f/2$ and $6\Delta f/2$ respectively. These frequency shifts, which are even multiples of $\Delta f/2$, explain the use of an even Fourier transformation device in the system described in U.S. Pat. No. 3,891,803. The multiplex signal obtained at the output of the time multiplexing device 5 is the result of the superposition of the three signals filtered in this manner. If the characteristics $F_1$, $F_2$ and $F_3$ correspond to infinitely high attenuation outside the pass band, the multiplex signal obtained has the ideal shape shown in FIG. 3e. In practice this attenuation is not infinite and hence there is crosstalk between the signals of the multiplex signal. If the signals processed in the system are speech signals, this crosstalk is intelligible, because in each spectrum 3a, 3b or 3c the part of the spectrum in the pass band of $F_1$, $F_2$ or $F_3$ respectively has the same direction as in the adjoining suppressed bands. If such a system is to be suitable for practical use the intelligible crosstalk must be eliminated. Hence the attenuation of the suppressed bands is required to exceed the attenuation in the pass band by 80 dB. In the system described hitherto this requirement necessitates an increase in the number of coefficients which are used in the arithmetic units of the device 3, which consequently becomes comparatively complex.

The present invention enables the crosstalk between the various channels of the multiplex signal to be considerably reduced by simple means while considerably simplifying the construction of the input modulators $M_1$, $M_2$ and $M_3$. These results are obtained while retaining the important advantage of the aforedescribed system, i.e. a reduced computing speed, which is equal to $1/\Delta f$ in all the arithmetic units.

According to the present invention each input circuit in the form of a converter, for example $M_1$, includes means $d_1$ to divide the codewords of the digital input signal equally between two branches $p_1$ and $q_1$, the branch $p_1$ including a delay circuit $r_1$. As is shown, the codewords appear at the input of a circuit $M_1$ at a Nyquist sampling frequency $2\Delta f$. The codewords in the branches $p_1$ and $q_1$ consequently occur at a frequency $\Delta f$ but shifted by $\frac{1}{2}\Delta f=4T$ in one branch relative to the other. The circuit $r_1$ provides a delay of 4T and hence ensures that thhe codewords occur simultaneously at the outputs of the two branches $p_1$ and $q_1$.

In a first embodiment each input circuit in the form of a modulator, such as $M_1$, further includes means $m_1$ and $n_1$ for modulating the signals in the branches $p_1$ and $q_1$ by means of carrier signals in quadrature modulation at the frequency $\Delta f/2$. It is known that such modulation can be effected by means of circuits $m_1$ and $n_1$ which reverse the sign of one of every two codewords in the branches $p_1$ and $q_1$ respectively.

The other input circuits $M_2$ and $M_3$ are similarly constructed from elements designated correspondingly.

The resulting input circuits $M_1$, $M_2$ and $M_3$ are connected to pairs of inputs $(\alpha_1, \beta_1)$, $(\alpha_2, \beta_2)$, $(\alpha_3, \beta_3)$ respectively of the Fourier transformation device which in this first embodiment performs an even discrete Fourier transformation just as in the system described in prior U.S. Pat. No. 3,891,803.

The symmetrical outputs of the Fourier transformation device 1, i.e. the outputs $v_1$ and $v_7$, $v_2$ and $v_6$, and $v_3$ and $v_5$, are connected to addition circuits 11, 12 and 13 respectively the outputs of which are connected to arithmetic units $A_1$ and $A_7$, $A_2$ and $A_6$, and $A_3$ and $A_5$ respectively, and also to subtraction circuits 14, 15 and 16 respectively the outputs of which are connected to arithmetic units $B_1$ and $B_7$, $B_2$ and $B_6$, and $B_3$ and $B_5$ respectively.

Figure 2:
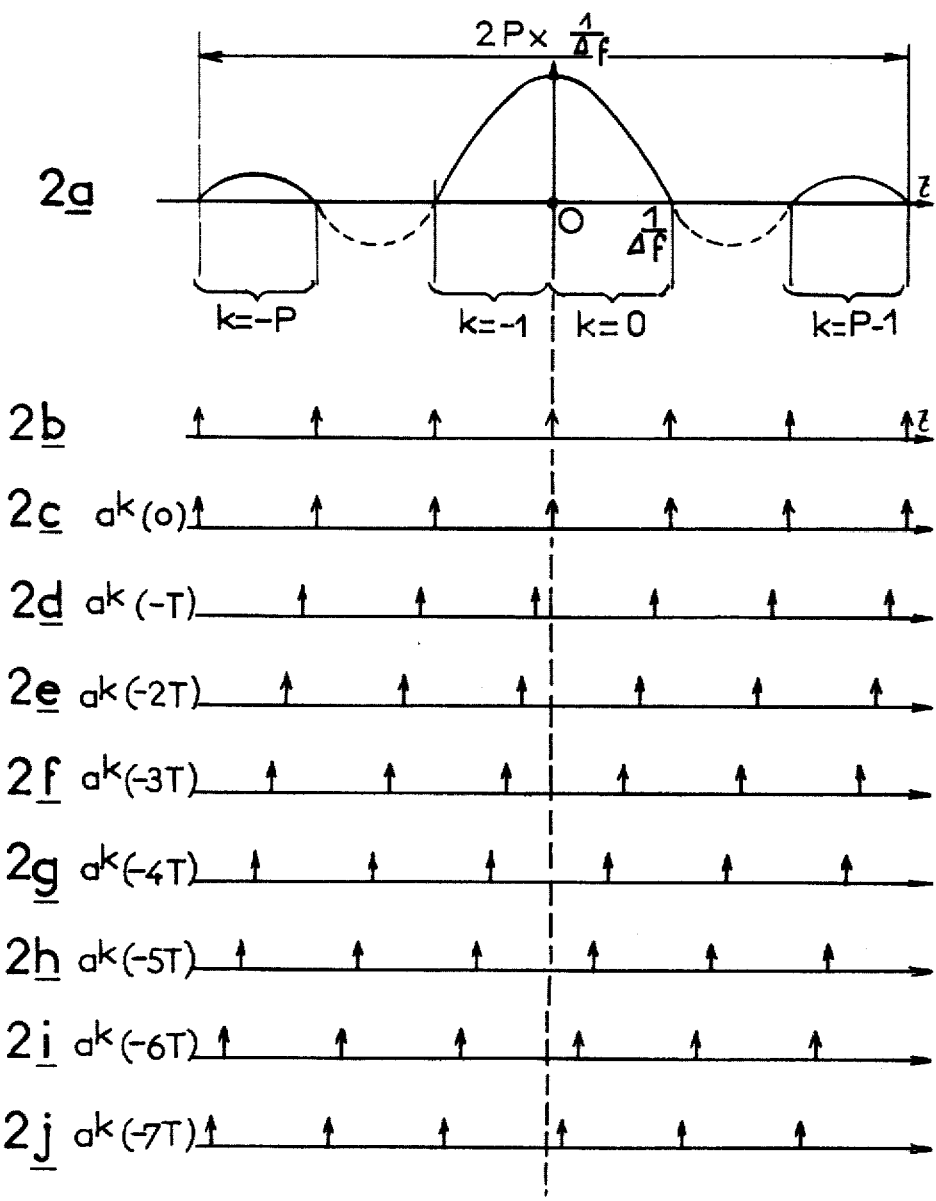
FIG. 2 shows diagrammatically the coefficients of the baseband filter to be used in the arithmetic members.

The outputs $\sigma_1$, $\sigma_2$ and $\sigma_3$ of the addition circuits 11, 12 and 13 respectively are connected to pairs of arithmetic units $A_i$, viz. to $(A_1, A_7)$, $(A_2, A_6)$ and $(A_3, A_5)$ respectively, the arithmetic units of each pair using as sets of coefficients the values of the impulse response of the low-pass filter at instants situated symmetrically with respect to a reference instant. For example, the output $\sigma_1$ of the addition circuit 11 is connected to the pair of arithmetic units $A_1$ and $A_7$ which use the sets of coefficients $a^k(-T)$ and $a^k(-7T)$ respectively. The diagrams 2d and 2j of FIG. 2 show that these sets of coefficients $a^k(-T)$ and $a^k(-7T)$ are obtained by sampling the impulse response of FIG. 2a at instants which are situated symmetrically with respect to the reference instant $t=0$. For simplicity hereinafter such sets of coefficients will be referred to as sets of symmetrical coefficients. Similarly, the output $\sigma_2$ of the addition circuit 12 is connected to the pair of arithmetic units $A_2$ and $A_6$ which use the sets of symmetrical coefficients $a^k(-2T)$ and $a^k(-6T)$ shown in diagrams 2e and 2i respectively. Finally the output $\sigma_3$ of the addition circuit 13 is connected to the pair of arithmetic units $A_3$ and $A_5$ which use the sets of symmetrical coefficients $a^k(-3T)$ and $a^k(-5T)$ shown in diagrams 2f and 2h respectively.

The outputs $\sigma_1$, $\sigma_2$ and $\sigma_3$ of the subtraction circuits 14, 15 and 16 respectively also are connected to pairs of arithmetic units, namely to $(B_1, B_7)$, $(B_2, B_6)$ and $(B_3, B_5)$ respectively, and also use sets of symmetrical coefficients, namely $[a^k(-5T), a^k(-3T)]$, $[a^k(-6T), a^k(-2T)]$ and $[a^k(-7T), a^k(-T)]$ respectively. For the arithmetic units $B_5$, $B_6$ and $B_7$ this connection is established via circuits 18, 19 and 20 respectively which reverse the signs of the codewords $\sigma'_3$, $\sigma'_2$ and $\sigma'_1$ respectively.

The arithmetic unit $A_1$ of the device 3 corresponds to the arithmetic unit $B_1$ of the device 17, because $A_1$ and $B_1$ are connected to the addition and subtraction circuits 11 and 14 respectively which are connected to the same symmetrical output $v_1$ and $v_7$ of the Fourier transformation device 1. Similarly the arithmetic units $A_2$, $A_3$, $A_5$, $A_6$ and $A_7$ of the device 3 correspond to the arithmetic units $B_2$, $B_3$, $B_5$, $B_6$ and $B_7$ respectively of the device 17 for the same reasons. The sets of coefficients which are used in the corresponding arithmetic units of the two devices are values of the impulse response of the low-pass filter at instants which are relatively shifted by $4T$. Thus from the sets of coefficients $a^k(-T)$, $a^k(-2T)$, $a^k(-3T)$, $a^k(-5T)$, $a^k(-6T)$ and $a^k(-7T)$ which are used in the arithmetic units $A_1$, $A_2$, $A_3$, $A_5$, $A_6$ and $A_7$ respectively, the sets of coefficients $a^k(-5T)$, $a^k(-6T)$, $a^k(-7T)$, $a^k(-T)$, $a^k(-2T)$ and $a^k(-3T)$ respectively are derived which are used in the corresponding arithmetic units $B_1$, $B_2$, $B_3$, $B_5$, $B_6$ and $B_7$ respectively.

For forming the digital signals which are supplied to the inputs $S_1$, $S_2$, $S_3$, $S_5$, $S_6$ and $S_7$ of the series-parallel converter 5 the codewords $s_1$ and $s'_1$ $s_2$ and $s'_2$, $s_3$ and $s'_3$, $s_5$ and $s'_5$, $s_6$ and $s'_6$, and $s_7$ and $s'_7$ respectively, which are supplied by the corresponding arithmetic units of the two devices 3 and 17, are combined in addition circuits 21 to 26 respectively.

The outputs $v_0$ and $v_4$ of the Fourier transformation device 1 are special cases with respect to which the following is stated. They have no corresponding symmetrical outputs. Hence these outputs $v_0$ and $v_4$ are not connected to addition or subtraction circuits. In the device 3 they are connected to the arithmetic units $A_0$ and $A_4$ respectively which use the sets of coefficients $a^k(0)$ and $a^k(-4T)$ shown in the diagrams 2c and 2g respectively of FIG. 2. To obtain a homogeneous notation the codewords at the inputs of the said arithmetic units $A_0$ and $A_4$ are referred to as $\sigma_0$ and $\sigma_4$ respectively, while the codewords at their outputs are referred to as $s_0$ and $s_4$ respectively.

As will be shown hereinafter, the device 17 includes no arithmetic unit which corresponds to the arithmetic units $A_0$ and $A_4$, the codewords $s_0$ and $s_4$ being directly applied to the inputs $S_0$ and $S_4$ respectively of the series-parallel converter 5.

With respect to the system described in the U.S. Pat. No. 3,891,803 it should be mentioned that the low-pass filters having the cut-off frequency $\Delta f/2$ with which the input circuits $M_1$ and $M_3$ were provided have been omitted. However, the use of a second set of arithmetic units need not necessarily mean an increase in the equipment used. It will be shown that, if the coefficients used in the two devices are derived from an impulse response which is symmetrical with respect to the instant $t=0$, the arithmetic units of the two devices can be combined so that substantially the same equipment is used as is necessary for one device. An explanation of the operation will show that the system gives rise to unintelligible crosstalk between the channels of the multiplex signal so that less severe filtering is required, which corresponds to a saving in equipment in the arithmetic units.

Figure 4:
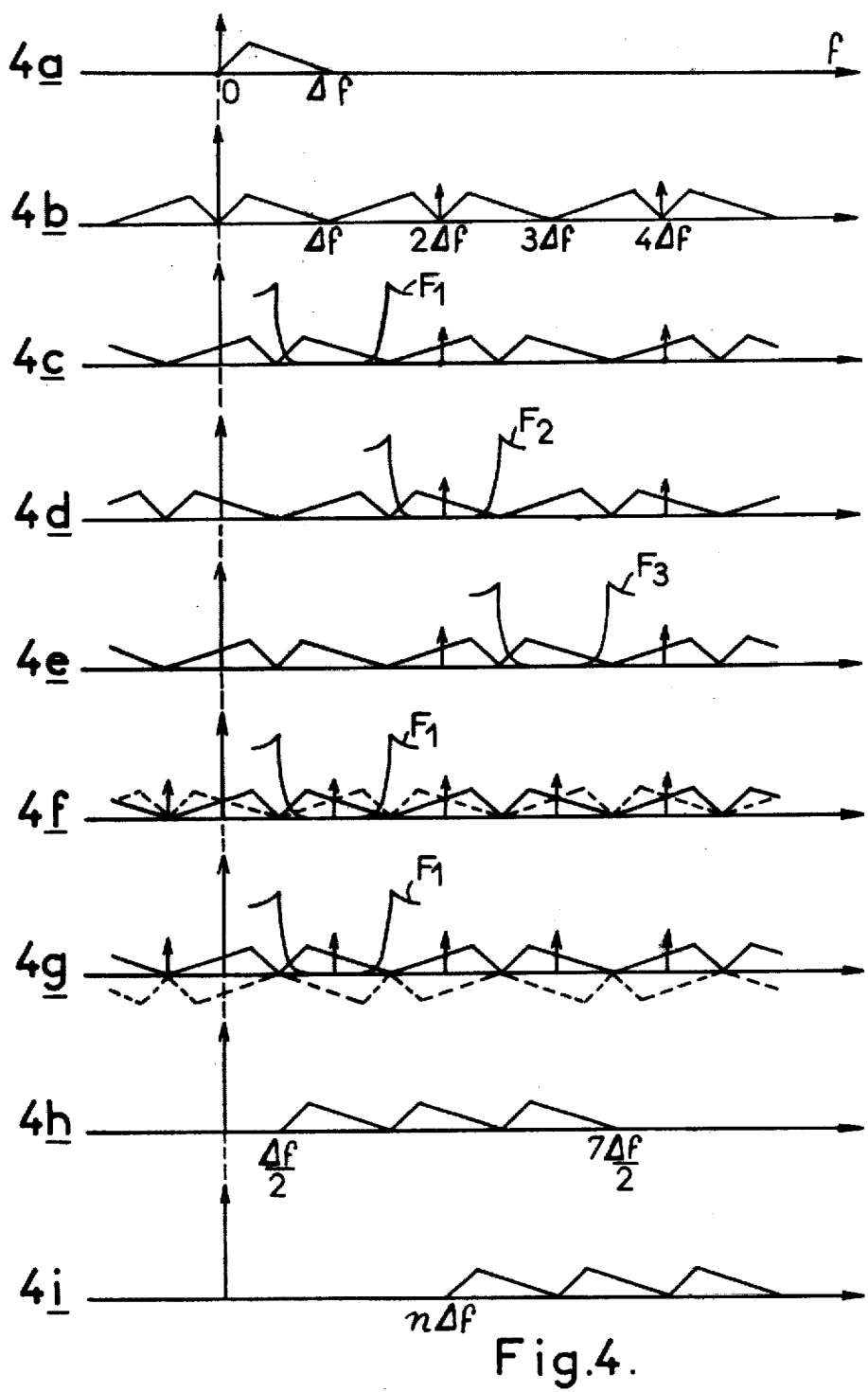
FIG. 4a–i show the spectra of the signals in the first embodiment of the system according to the invention.

In order to explain the operation of the system according to the present invention, the forms of the spectra of the signal at the outputs of the circuits $M_1$, $M_2$ and $M_3$, and the filtering operations to be performed on these signals in order to obtain the desired multiplex signal, will now be described by means of the diagrams of FIG. 4.

The diagram 4a shows the spectrum of the analog signals of bandwidth $\Delta f$ which are applied to the input of the system. The diagram 4b shows the spectra of these signals at the outputs of the analog-to-digital converters $E_1$, $E_2$ and $E_3$ in which they are sampled at the Nyquist frequency $2\Delta f$. The arrows represent the sampling frequency $2\Delta f$ and its multiples about which the spectrum of the analog signals shown in diagram 4a is obtained.

The signal applied to the circuit $M_1$ is quadrature-modulated by the two modulators $m_1$ and $n_1$ by means of two carriers of frequency $\Delta f/2$, which for this signal corresponds to a translation of its spectrum by $\Delta f/2$; this spectrum is shown in the diagram 4c. The signal applied to the circuit $M_2$ is subjected to the same operation by the two modulators $m_2$ and $n_2$, however, with a phase such of the carrier signals that its spectrum is translated by $-\Delta f/2$, as is shown in the diagram 4d. Finally the two modulators $m_3$ and $n_3$ effect a spectrum translation of the signal applied to the circuit $M_3$ by $\Delta f/2$, as is shown in diagram 4e.

These spectra 4c, 4d and 4e may be considered to be spectra of complex signals $X_1$, $X_2$ and $X_3$ respectively sampled at the frequency $2\Delta f$. Each of these complex signals $X_1$, $X_2$ and $X_3$ is the sum of a real component $C_1$, $C_2$ and $C_3$ having a cosine spectrum and an imaginary component $D_1$, $D_2$ and $D_3$ respectively having a sine spectrum. For example, the cosine and sine spectra of the real component $C_1$ and of the imaginary component $D_1$ of the complex signal $X_1$ have the forms shown in the usual manner by diagrams 4f and 4g respectively. The digital signals which correspond to the real components $C_1$, $C_2$ and $C_3$ are produced in the branches $p_1$, $p_2$ and $p_3$ respectively of the input circuits, while the digital signals which correspond to the imaginary components $D_1$, $D_2$ and $D_3$ appear in the branches $q_1$, $q_2$ and $q_3$ respectively of the input circuits. In the branches $p_1$, $p_2$ and $p_3$ the samples of the components $C_1$, $C_2$ and $C_3$ respectively have the frequency $\Delta f$; in the branches $q_1$, $q_2$ and $q_3$ the samples of the components $D_1$, $D_2$ and $D_3$ respectively have the frequency $\Delta f$ also, however, they are shifted by an interval $\frac{1}{2}f=4T$ relative to the samples in the branches $p_1$, $p_2$ and $p_3$. The delay circuits $r_1$, $r_2$ and $r_3$ introduce delays of $4T$ into the branches $p_1$, $p_2$ and $p_3$ respectively so that at the outputs of the circuits $M_1$, $M_2$ and $M_3$ the samples of the real and imaginary components are simultaneously obtained at the frequency $\Delta f$. However, these delay circuits do not modify the values of the samples and hence the spectra of the complex signals.

It should be mentioned that the spectra 4b, 4c and 4d of the complex signals supplied by the input circuits $M_1$, $M_2$ and $M_3$ respectively have forms entirely different from those of the spectra 3a, 3b and 3c respectively of the output signals of the input circuits according to U.S. Pat. No. 3,891,803. In this prior application the complex signals provided by the input circuits are sampled at the frequency $\Delta f$, and at the outputs of the input circuits the real and imaginary components simultaneously sampled at the frequency $\Delta f$ are obtained. In the present invention the complex signals provided by the input modulators are sampled at the frequency $2\Delta f$, and at the outputs of the input circuits the real and imaginary components sampled at the frequency $\Delta f$ are obtained, however, the sampling instants of these two components are relatively shifted by $\frac{1}{2}\Delta f=4T$.

To obtain the desired multiplex signal the elements of the present system connected after the input circuits $M_1$, $M_2$ and $M_3$ also are required to filter the complex signals $X_1$, $X_2$ and $X_3$ respectively by means of filters having attenuation characteristics $F_1$, $F_2$ and $F_3$ respectively shown by dotted lines in the diagrams 4b, 4c and 4d respectively. The filtered signals then must be time-multiplexed to obtain the multiplex signal shown in diagram 4h.

However, in the present case, because the real and imaginary components of the said complex signals are sampled at different instants, i.e. at instants relatively shifted by $4T$, the operation corresponding to the said filtering operations must be performed on the real and imaginary components separately. The diagrams 4f and 4g, for example, show the filtering characteristic $F_1$ used for the spectra of the real component and the imaginary component respectively of the complex signal $X_1$.

Figure 7:
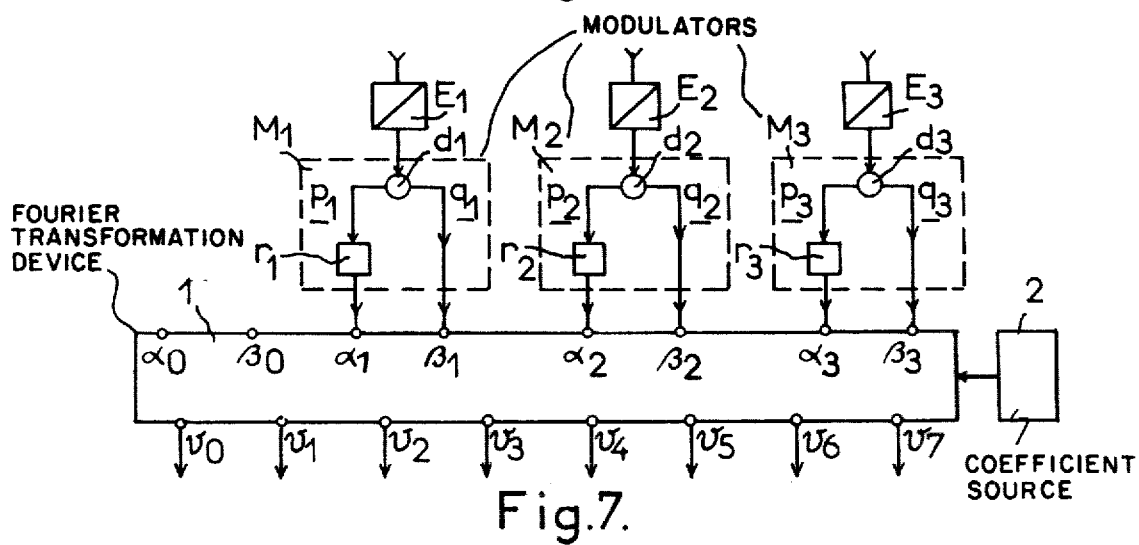
FIG. 7 is the circuit diagram of the input circuits according to the second embodiment of the system according to the invention.

To explain the operation of the system shown in FIG. 7, the operations to be performed by two arrangements according to prior U.S. Pat. No. 3,891,803 on the real and the imaginary components respectively of the complex signals supplied by the input circuits will be described mathematically, and subsequently it will be shown that these arguments together are reduced to the system shown in FIG. 1.

The first arrangement for processing the real components $C_1$, $C_2$ and $C_3$ would first comprise a Fourier transformation device having four pairs of inputs to the real ones $\alpha_1$, $\alpha_2$ and $\alpha_3$ of which the real components $C_1$, $C_2$ and $C_3$ respectively would be applied. If the codewords at the eight outputs of the said Fourier transformation device are referred to as $\sigma_0$ to $\sigma_7$, the said codewords are subjected to operations which are defined by the above expression (1) and which are shown in the first column of the following table Table I.

TABLE I $$\sigma_0 = \text{Re}\left[\sum_{n=0}^{3} C_n\right] \qquad \sigma_0 = \sum_{n=0}^{3} C_n \qquad S_0 = \sum_{-P}^{P-1} \sigma_0{}^k \cdot a^k(0)$$

$$\sigma_1 = \text{Re}\left[\sum_{n=0}^{3} C_n \cdot e^{j2\pi \frac{n}{8}}\right] \qquad \sigma_1 = \sum_{n=0}^{3} C_n \cdot \cos 2\pi \frac{n}{8} \qquad S_1 = \sum_{k=-P}^{P-1} \sigma_1{}^k \cdot a^k(-T)$$

$$\sigma_2 = \text{Re}\left[\sum_{n=0}^{3} C_n \cdot e^{j2\pi \frac{2n}{8}}\right] \qquad \sigma_2 = \sum_{n=0}^{3} C_n \cdot \cos 2\pi \frac{2n}{8} \qquad S_2 = \sum_{k=-P}^{P-1} \sigma_2{}^k \cdot a^k(-2T)$$

$$\sigma_3 = \text{Re}\left[\sum_{n=0}^{3} C_n \cdot e^{j2\pi \frac{3n}{8}}\right] \qquad \sigma_3 = \sum_{n=0}^{3} C_n \cdot \cos 2\pi \frac{3n}{8} \qquad S_3 = \sum_{-P}^{P-1} \sigma_3{}^k \cdot a^k(-3T)$$

$$\sigma_4 = \text{Re}\left[\sum_{n=0}^{3} C_n \cdot e^{j2\pi \frac{4n}{8}}\right] \qquad \sigma_4 = \sum_{n=0}^{3} C_n \cdot \cos \pi n \qquad S_4 = \sum_{-P}^{P-1} \sigma_4{}^k \cdot a^k(-4T)$$

$$\sigma_5 = \text{Re}\left[\sum_{n=0}^{3} C_n \cdot e^{j2\pi \frac{5n}{8}}\right] \qquad \sigma_5 = \sigma_3 \qquad S_5 = \sum_{-P}^{P-1} \sigma_5{}^k \cdot a^k(-5T)$$

$$\sigma_6 = \text{Re}\left[\sum_{n=0}^{3} C_n \cdot e^{j2\pi \frac{6n}{8}}\right] \qquad \sigma_6 = \sigma_2 \qquad S_6 = \sum_{-P}^{P-1} \sigma_6{}^k \cdot a^k(-6T)$$

TABLE I-continued

| | $\sigma_7 = \sigma_1$ | |
|---|---|---|
| $\sigma_7 = \mathrm{Re}\left[\sum_{n=0}^{3} C_n \cdot e^{j2\pi \frac{7n}{8}}\right]$ | | $S_7 = \sum_{-P}^{P-1} \sigma_7{}^k \cdot a^k(-7T)$ |

In these expressions the symbol Re means that the real part of the expression in brackets is used. These real parts are shown in the second column of Table I. It will be seen that the codewords $\sigma_5$, $\sigma_6$ and $\sigma_7$ are equal to $\sigma_3$, $\sigma_2$, and $\sigma_1$ respectively.

The first arrangement would then comprise a set of arithmetic units for processing the codewords $\sigma_0$ to $\sigma_7$. These arithmetic units, which are not constructed in recursive form, would, if the aforementioned formula (2) were used, supply the codewords $s_0$ to $s_7$ shown in the third column of Table I. In the expressions for $s_5$, $s_6$ and $s_7$ the identities given in the second column, namely $\sigma_5 = \sigma_3$, $\sigma_6 = \sigma_2$ and $\sigma_7 = \sigma_1$, have been taken into account.

The first arrangement would further comprise a series-parallel converter for time-multiplexing the codewords $s_0$ to $s_7$ so that the real component of the desired multiplex signal is obtained.

In the same manner the second arrangement for processing the imaginary components $D_1$, $D_2$ and $D_3$ would first comprise a Fourier transformation device to the imaginary inputs $\beta_1$, $\beta_2$ and $\beta_3$ of which the components $D_1$, $D_2$ and $D_3$ respectively would be supplied. Owing to the computation performed in the Fourier transformation device these components would be written in imaginary representation as $jD_1$, $jD_2$ and $jD_3$ respectively. Using the formula (1) the codewords $\sigma'_0$ to $\sigma'_7$ at the outputs of this Fourier transformation device will give the expressions given in the first column of the following Table II.

ance must be made for the fact that the sampling instants for the components $D_1$, $D_2$ and $D_3$ processed in this second arrangement are delayed by 4T relative to the sampling instants for the components $C_1$, $C_2$ and $C_3$ respectively processed in the first arrangement. This results in that in applying the formula (2) the set of coefficients $a^k(-iT-4T)$ will be used, corresponding to the delay by 4T of the sampling instants. Thus at the outputs of the arithmetic units of the second arrangement the codewords $s'_0$ to $s'_7$ are obtained which are given in the third column of Table II. Now $s'_0 = 0$, $s'_4 = 0$, and in the expressions $s'_5$, $s'_6$ and $s'_7$ the identities given in the second column, namely $\sigma'_5 = -\sigma'_3$, $\sigma'_6 = -\sigma'_2$ and $\sigma'_7 = -\sigma'_1$ are taken into account.

This second arrangement would finally comprise a series-parallel converter for so time-multiplexing the codewords $s'_0$ to $s'_7$ that the imaginary component of the desired multiplex signal is obtained.

Summation of the real component and the imaginary component of the multiplex signal would give the desired multiplex signal having the spectrum shown in the diagram of FIG. 4h.

In actual fact, in the system according to the invention as shown in FIG. 1 the two arrangements are combined for performing all the operations which are shown in the Tables I and II and provide the desired multiplex signal. It will be shown that the system of FIG. 1 following the input circuits $M_1$, $M_2$ and $M_3$ performs the operations of the Tables I and II.

Hereinbefore it has been set forth that the delay cir-

TABLE II

| | | |
|---|---|---|
| $\sigma' = \mathrm{Re} \sum_{n=0}^{3} jDn$ | $\sigma_0' = 0$ | $S_0' = 0$ |
| $\sigma' = \mathrm{Re} \sum_{n=0}^{3} jDn \cdot e^{j2\pi \frac{n}{8}}$ | $\sigma_1' = \sum_{n=0}^{3} Dn \sin 2\pi \frac{n}{8}$ | $S_1' = \sum_{k=-P}^{P-1} \sigma_1'^k \cdot a^k(-5T)$ |
| $\sigma' = \mathrm{Re} \sum_{n=0}^{3} jDn \cdot e^{j2\pi \frac{2n}{8}}$ | $\sigma_2' = \sum_{n=0}^{3} Dn \sin 2\pi \frac{2n}{8}$ | $S_2' = \sum_{k=-P}^{P-1} \sigma_2'^k \cdot a^k(-6T)$ |
| $\sigma' = \mathrm{Re} \sum_{n=0}^{3} jDn \cdot e^{j2\pi \frac{3n}{8}}$ | $\sigma_3' = \sum_{n=0}^{3} Dn \sin 2\pi \frac{3n}{8}$ | $S_3' = \sum_{k=-P}^{P-1} \sigma_3'^k \cdot a^k(-7T)$ |
| $\sigma' = \mathrm{Re} \sum_{n=0}^{3} jDn \cdot e^{j2\pi \frac{4n}{8}}$ | $\sigma_4' = 0$ | $S_4' = 0$ |
| $\sigma' = \mathrm{Re} \sum_{n=0}^{3} jDn \cdot e^{j2\pi \frac{5n}{8}}$ | $\sigma_5' = -\sigma_3'$ | $S_5' = \sum_{k=-P}^{P-1} \sigma_3'^k \cdot a^k(-T)$ |
| $\sigma' = \mathrm{Re} \sum_{n=0}^{3} jDn \cdot e^{j2\pi \frac{6n}{8}}$ | $\sigma_6' = -\sigma_2'$ | $S_6' = \sum_{k=-P}^{P-1} \sigma_2'^k \cdot a^k(-2T)$ |
| $\sigma' = \mathrm{Re} \sum_{n=0}^{3} jDn \cdot e^{j2\pi \frac{7n}{8}}$ | $\sigma_7' = \sigma_1'$ | $S_7' = \sum_{k=-P}^{P-1} \sigma_1'^k \cdot a^k(-3T)$ |

For the codewords $\sigma'_0$ to $\sigma'_7$ the expressions given in the second column of Table II are derived. It will be seen that $\sigma'_0 = \sigma'_4 = 0$, and that the codewords $\sigma'_1$, $\sigma'_2$ and $\sigma'_3$ in absolute value are equal to the codewords $\sigma'_7$, $\sigma'_6$ and $\sigma'_5$ respectively but are of opposite sign.

The second arrangement would further comprise a set of arithmetic units for processing the codewords $\sigma'_0$ to $\sigma'_7$. In order to obtain the codewords $s'_0$ to $s'_7$ at the outputs of the said arithmetic units, which are not constructed in recursive form, the aforementioned formula (2) is applied, however, in the coefficients used allowcuits $r_1$, $r_2$ and $r_3$ in the input circuits enable the real components $C_1$, $C_2$ and $C_3$ and the imaginary components $D_1$, $D_2$ and $D_3$ of the complex signals $X_1$, $X_2$ and $X_3$ respectively to be simultaneously obtained at the frequency f. Thus the complex pairs of inputs $(\alpha_1, \beta_1)$, $(\alpha_2, \beta_2)$ and $(\alpha_3, \beta_3)$ of the Fourier transformation device have applied to them the complex signals $X_1 = C_1 + jD_1$, $X_2 = C_2 + jD_2$ and $X_3 = C_3 + jD_3$ respectively which occur at the frequency $\Delta f$.

When using the formula (1), at any output $v_i$ of this Fourier transformation device 1 the codewords:

$$v_i = Re \sum_{n=0}^{3} (C_n + jD_n) \cdot e^{j2\frac{\pi i n}{B}}$$

are obtained.

As the use of this latter formula shows, at the outputs $v_0$ and $v_4$ of the Fourier transformation device 1 the codewords $\sigma_0$ and $\sigma_4$ respectively appear which are given in the second column of Table I. Similarly it can be shown that at the outputs of the addition circuits 11, 12 and 13 which supply the sums $v_1+v_7$, $v_2+v_6$ and $v_3+v_5$ respectively the codewords $\sigma_1$, $\sigma_2$ and $\sigma_3$ respectively occur which are given in the second column of Table I. At the outputs of the subtraction circuits 14, 15, 16, which supply the differences $v_7-v_1$, $v_6-v_2$ and $v_5-v_3$ respectively, the codewords $\sigma'_1$, $\sigma'_2$ and $\sigma'_3$ respectively occur which are given in the second column of Table II.

To obtain the codewords $s_0$ to $s_7$ in accordance with the operations shown in the third column of Table I, the set 3 of arithmetic units is used: the codewords $\sigma_0$ are applied to the arithmetic unit $A_0$ which uses the set of coefficients $a^k(0)$; the codewords $\sigma_1$, $\sigma_2$ and $\sigma_3$ are applied to the arithmetic units $A_1$, $A_2$ and $A_3$ respectively which use the sets of coefficients $a^k(-T)$, $a^k(-2T)$ and $a^k(-3T)$ respectively; the codewords $\sigma_4$ are supplied to the arithmetic unit $A_4$ which uses the sets of coefficients $a^k(-4T)$; finally the codewords $\sigma_3$, $\sigma_2$ and $\sigma_1$ are also supplied to the arithmetic units $A_5$, $A_6$ and $A_7$ respectively which use the sets of coefficients $a^k(-5T)$, $a^k(-6T)$ and $a^k(-7T)$ respectively. The arithmetic units $A_0$ to $A_7$ thus provide the codewords $s_0$ to $s_7$ having the expressions shown in the third column of Table I.

For performing the operations shown in the third column of Table II the set of arithmetic units 17 is used: the codewords $s'_0$ and $s'_4$, which always are equal to zero, need not be computed; the codewords $\sigma'_1$, $\sigma'_2$ and $\sigma'_3$ are supplied to the arithmetic units $B_1$, $B_2$ and $B_3$ which use the sets of coefficients $a^k(-5T)$, $a^k(-6T)$ and $a^k(-7T)$ and thus provide the codewords $s'_1$, $s'_2$ and $s'_3$ respectively. The codewords $\sigma'_3$, $\sigma'_2$ and $\sigma'_1$ the signs of which have been reversed are supplied to the arithmetic units $B_5$, $B_6$ and $B_7$ respectively which use the sets of coefficients $a^k(-T)$, $a^k(-2T)$ and $a^k(-3T)$ and thus provide the codewords $s'_5$, $s'_6$ and $s'_7$ respectively.

Because the codewords at the outputs of the two sets 3 and 17 of arithmetic units occur simultaneously, the codewords provided by the corresponding arithmetic units $A_1$ and $B_1$ to $A_7$ and $B_7$ are added by means of the circuits 21 to 26. The codewords $S_0=s_0$, $S_1=s+s'_1$, $S_2=s_2+s'_2$, $S_3=s_3+s'_3$, $S_4=s_4$, $S_5=s_5+s'_5$, $S_6=s_6+s'_6$ and $S_7=s_7+s'_7$ are supplied to the inputs of the series-parallel converter 5.

At the output 6 of the converter 5 the desired multiplex signal having the spectrum shown in FIG. 4h is directly obtained.

While retaining an important advantage of prior U.S. Pat. No. 3,891,803, i.e. the reduced computing speed which is equal to the bandwidth $\Delta f$ of a channel signal, the present system permits further reduction of equipment and cost. The construction of the input circuits is simplified by dispensing with all filtering circuits in the converters. Examination of the spectra 4c, 4d and 4e of the complex signals provided by the converters clearly shows that after filtering these signals, using non-ideal filter characteristics $F_1$, $F_2$ and $F_3$, unintelligible crosstalk between the channels of obtained is obtained. This unintelligible crosstalk requires characteristics $F_1$, $F_2$ and $F_3$ less stringent than those required for filtering the complex signals in the system according to prior U.S. Pat. No. 3,891,803. Less stringent filter characteristics result in a reduction of the number of low pass filter coefficients stored in the store 4 and a reduction of the stores and of the computing circuits in the sets of arithmetic units.

An additional reduction in volume of the equipment is obtained in a preferred embodiment of the invention which will now be described. Whereas hitherto no supposition has been made in respect of the shape of the impulse response of the low pass filter, in this preferred embodiment the impulse response has a symmetry axis which passes through the reference instant. The diagram 2a of FIG. 2 shows such an impulse response the values of which at instants symmetrical about the time $t=0$ are equal.

In this case it can be deduced from the diagrams 2d and 2j that in the set of coefficients $a^k(-T)$ and $a^k(-7T)$ the coefficients have the same values but appear in reverse order for increasing times. By means of the diagrams 2e and 2j the same will be observed in respect of the two sets of coefficients $a^k(-2T)$ and $a^k(-6T)$ and also, by means of the diagrams 2f and 2h, for the two sets of coefficients $a^k(-3T)$ and $a^k(-5T)$.

Figure 5:
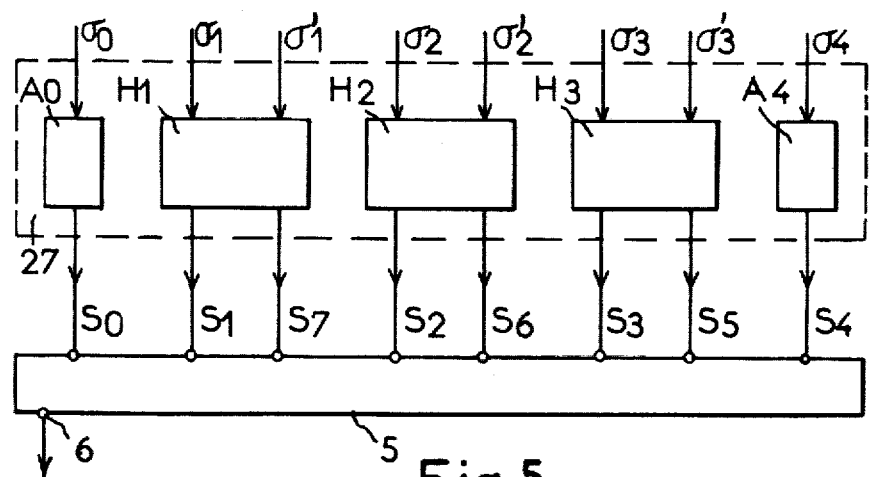
FIG. 5 is a block schematic diagram showing the arrangement of the two sets of arithmetic units for the case in which the impulse response of the baseband filter is symmetrical.
Figure 6:
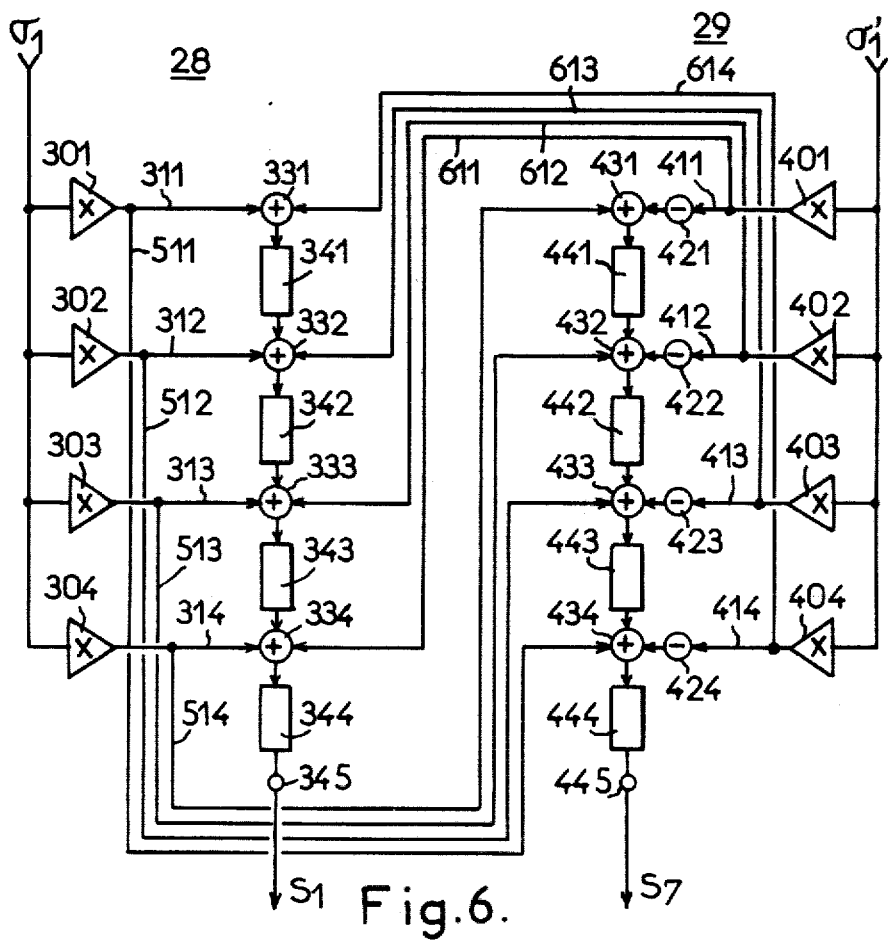
FIG. 6 shows the detailed circuit diagram of a combination of arithmetic units for this case.

By using this smilarity between sets of coefficients the arithmetic units of the two devices 3 and 17 can be rearranged according to the block-schematic diagram shown in FIG. 5 completed by a more detailed circuit diagram shown in FIG. 6.

In the arrangement shown in FIG. 5 the two devices 3 and 17 are reduced to a single device 27 which receives the codewords $\sigma_0$ to $\sigma_4$ and $\sigma'_1$ to $\sigma'_3$ formed in the same manner as in FIG. 1 and which supplies the same codewords $S_0$ to $S_7$ to the corresponding inputs of the series-parallel converter 5. The device 27 comprises arithmetic units $A_0$ and $A_4$, which are identical with those of FIG. 1 and are connected in the same manner. The computing device $H_1$ receives the codewords $\sigma_1$ and $\sigma'_1$, combines the four arithmetic units $A_1$, $B_1$, $A_7$ and $B_7$ and furnishes the codewords $S_1$ and $S_7$. The computing device $H_2$ receives the codewords $\sigma_2$ and $\sigma'_2$, combines the four arithmetic units $A_2$, $B_2$, $A_6$ and $B_6$ and furnishes the codewords $S_2$ and $S_6$. The computing devices $H_3$ receives the codewords $\sigma_3$ and $\sigma'_3$, combines the four arithmetic units $A_3$, $B_3$, $A_5$ and $B_5$ and furnishes the codewords $S_3$ and $S_5$.

The three computing devices $H_1$, $H_2$ and $H_3$ have identical functions and are constructed in the same manner. Hereinafter an embodiment of the computing device $H_1$ will be described by way of example with reference to FIG. 6, in which device the functions of the four arithmetic units $A_1$, $B_1$, $A_7$ and $B_7$ are substantially performed by means of the circuits of only two arithmetic units. It will be assumed, just as hitherto, that the four arithmetic units to be combined are of the non-recursive type. In this case it can be deduced from the third columns of Tables I and II that the operations to be performed in the device $H_1$ are given by the following formulas:

$$S_1 = s_1 - s_1' = \sum_{k=-P}^{P-1} \sigma_1^k \cdot a^k(-T) + \sum_{k=-P}^{P-1} \sigma_1'^k \cdot a^k(-5T) \quad (3)$$

-continued $$S_7 = s_7 - s_7' = \sum_{k=-P}^{P-1} {}^k{}_k \cdot a^k(-7T) - \sum_{k=-P}^{P-1} {}^k{}_k \cdot a^k(-5T) \quad (4)$$

The computing device shown in FIG. 6 comprises two arithmetic units 28 and 29 which each are designed as a digital filter according to the technique described, for example, in an article by L. B. Jackson "On the Interaction of Roundoff Noise and Dynamic Range in Digital Filters", Bell System Technical Journal, Volume 49, pages 159-184, February 1970; by omitting the recursive part of the filter shown in FIG. 4 of this article an arithmetic unit 28 or 29 is obtained.

In the arithmetic unit 28 the codewords $\sigma_1$ are applied to 2P multipliers 301 to 304 which are connected by lines 311 to 314 to aders 331 to 334 respectively. The latter in conjunction with delay circuits 341 to 344 form a series circuit. The output of the delay circuit 344 is the output 345 of the arithmetic unit 28.

In the arithmetic unit 29 the codewords $\sigma'_1$ are applied to 2P multipliers 401 to 404 which are connected by lines 411 to 414 to sign inverters 421 to 424 respectively. The latter are connected to adders 431 to 434 which in conjunction with delay circuits 441 to 444 form a series circuit. The output of the delay circuit 444 forms the output 445 of the arithmetic unit 29.

The arithmetic units 28 and 29 are also interconnected in the following manner:

The outputs of the multipliers 301 to 304 of the units 28 are connected by lines 511 to 514 to inputs of adders 434 to 431 respectively of the unit 29. The outputs of the multipliers 401 to 404 of the unit 29 are connected by lines 611 to 614 to inputs of the adders 334 to 331 respectively of the unit 28.

To the 2P multipliers 301 to 304 the 2P coefficients from the set of coefficients $a^k(-T)$ are supplied in the order from the coefficient corresponding to $k=-P$ for the multiplier 301 to the coefficient which corresponds to $k=(P-1)$ for the multiplier 304. Assuming for the time being that the codewords $\sigma'_1$ are not applied to the input of the unit 29, it will be seen that the unit 28 at its output 345 supplies the first term of the expression (3).

$$s_1 = \sum_{k=-P}^{P-1} \sigma_1{}^k \cdot a^k(-T)$$

Taking into account the above-explained similarity between the coefficients of the set $a^k(-7T)$ and $a^k(-T)$, owing to the connecting lines 511 to 514, at the output 445 of the unit 29 the first term of the expression (4) is obtained, which is $$s_7 = \sum_{-P}^{P-1} \sigma_1{}^k \cdot a^k(-7T).$$

On the other hand, the 2P coefficients of the set of coefficients $a^k(-3T)$ are applied to the 2P multipliers 401 to 404 respectively in the order from the coefficient corresponding to $k=-P$ for the multiplier 401 to the coefficient corresponding to $k=(P-1)$ for the multiplier 404. Assuming now that the codewords $\sigma_1$ are not applied to the input of the unit 28, it will be seen that the unit 29 at its output 445 will yield the second term of the expression (4), namely $$s_7' = -\sum_{-P}^{P-1} \sigma'_1{}^k \cdot a^k(-3T)$$

Taking into account the similarity between the coefficients of the set $a^k(-5T)$ and $a^k(-3T)$, owing to the connecting lines 611 to 614 at the output 345 of the unit 28 the second term of the expression (3) will appear, namely $$s_1' = \sum_{-P}^{P-1} \sigma'_1{}^k \cdot a^k(-5T)$$

If the codewords $\sigma_1$ and $\sigma'_1$ are simultaneously applied to the inputs of the arithmetic units 28 and 29 the outputs 345 and 445 of these units will furnish the codewords $S_1$ and $S_7$ in accordance with the expressions (3) and (4) respectively.

So far it has been assumed that the arithmetic units of the two sets 3 and 17 of FIG. 1 are of the non-recursive type. These arithmetic units may alternatively be of the recursive type, as is described in French patent application No. 7,342,527. Also the recursive arithmetic units of the two sets may be combined according to the block diagram of FIG. 5 when the impulse response of the base filter is symmetrical. In this case each arithmetic unit $H_1$, $H_2$ or $H_3$ may comprise two arithmetic units 28 and 29 interconnected in the manner shown in FIG. 6, and each arithmetic unit 28 or 29 may include a recursive part as described in the abovementioned article of Jackson.

In the system according to the present invention described so far and in the system described in prior U.S. Pat. No. 3,891,803 the digital-to-analog converter 7 connected to the output 6 of the series-parallel converter 5 furnishes a single-sideband frequency-division multiplex signal the lowest frequency of which is an odd multiple of one half of the bandwidth of a channel signal, i.e. an odd multiple of one half of the bandwidth of a channel signal, i.e. an odd multiple of the frequency $\Delta f/2$. Thus in the embodiment described with reference to FIG. 1 the spectrum of the multiplex signal obtained at the output of the converter 7 and shown in FIG. 4h extends from the lowest frequency $\Delta f/2$ over a band of width $3\Delta f$. To bring the multiplex signal to the desired band a modulator 9 is used which is energized by a generator 10 the frequency of which corresponds to the desired band. In the case of speech signals the lowest frequency of the multiplex signal in its ultimate band always is a multiple of the bandwidth $\Delta f$ of a channel signal. In this case the spectrum of FIG. 4h must be translated so as to occupy the band which extends from $n\Delta f$ to $(n+3)\Delta f$, as shown in FIG. 4i, where n is an integer. It will be clear that to perform this translation the modulation frequency supplied by the generator 9 must be an odd multiple of $\Delta f/2$. However, the use of such a modulation frequency gives rise to undesirable components at frequencies which are odd multiples of $\Delta f/2$, that is to say at the centers of the channels of the translated multiplex signal.

A second embodiment of the invention which enables this disadvantage to be avoided will now be described. In this second embodiment the input circuits $M_1$, $M_2$ and $M_3$ constituted by modulators are constructed according to the circuit diagram shown in FIG. 7. It will be seen that the modulator circuits $(m_1, n_1)$, $(m_2, n_2)$ and $(m_3, n_3)$ included in the first embodiment shown in FIG.

1 are dispensed with in this second embodiment. The outputs of the branches $(p_1, q_1)$, $(p_2, q_2)$ and $(p_3, q_3)$ here also are connected to the pairs of inputs $(\alpha_1, \beta_1)$, $(\alpha_2, \beta_2)$ and $(\alpha_3, \beta_3)$ respectively of the Fourier transformation device 1, which in this second embodiment is of the type which performs an odd discrete Fourier transformation. The coefficients supplied to the Fourier transformation device by the source 2 correspond to carrier signal functions the frequencies of which are odd multiples of the cut-off frequency $\Delta f/2$ of the base filter. Beyond the outputs $f_0$ to $f_7$ of the Fourier transformation device the circuit diagram shown in FIG. 1 is entirely used. However, the coefficients supplied to the sets of arithmetic units 3 and 17 by the source 4 are partly different. The various sets of coefficients $a^k(-T)$ to $a^k(-7T)$ here also are obtained from the values of the impulse response shown in diagram 2a of FIG. 2 at the sampling instants determined by the diagrams 2c and 2j, however, in each set the sign of one of each two consecutive values is inverted. In other words, according as the sampling instants of the impulse response 2a occur within intervals $1/\Delta f$ which correspond to an even or an odd value of k, the coefficients used in the second embodiment are the values of this response, for example with or without sign reversal.

Figure 8:
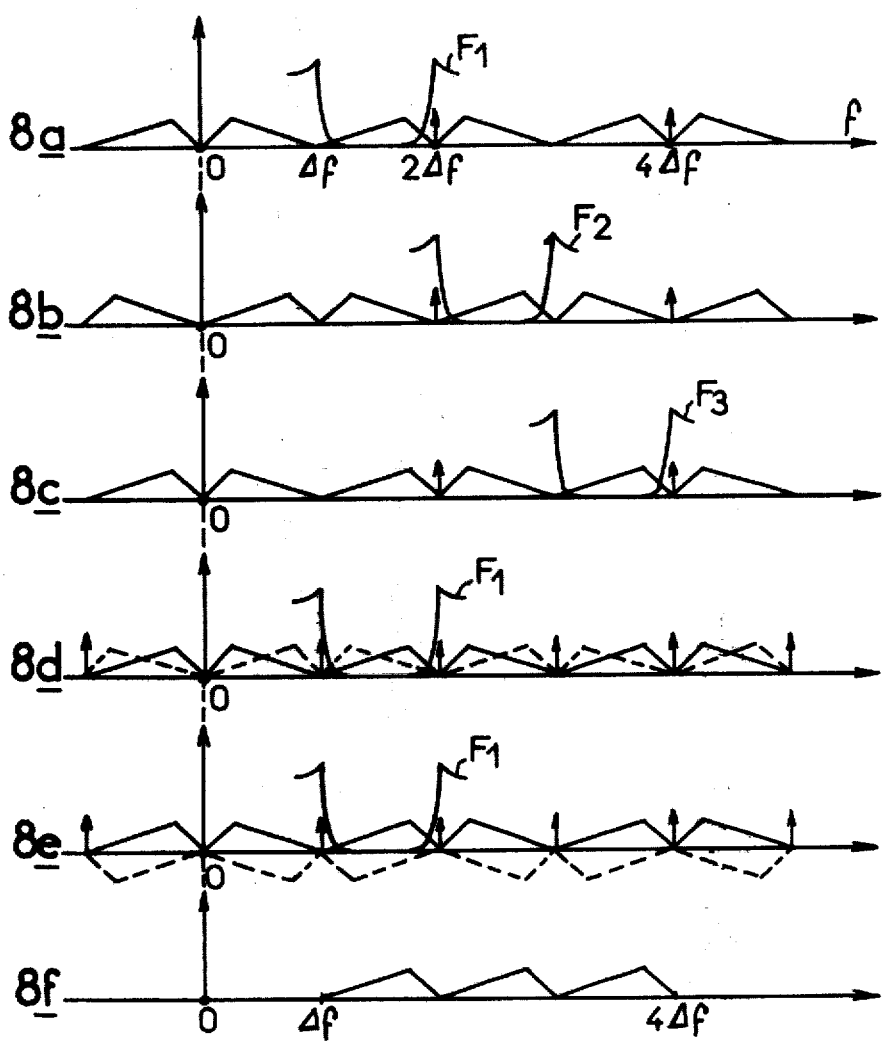
FIG. 8a–f show the spectra of the signals in this second embodiment.

It will now be shown that in the second embodiment of the invention at the output of the converter 7 a multiplex signal is obtained the lowest frequency of which is a multiple of the bandwidth $\Delta f$ of a channel signal. For this purpose the digrams of FIG. 8 show the shapes of the spectra of the signals at the inputs and at the outputs of the input circuits $M_1$, $M_2$ and $M_3$ in the form of converters and the operations to be performed in order to obtain the desired multiplex signal.

The diagram 8a shows the spectrum of the analog signal of bandwidth $\Delta f$ sampled at the Nyquist frequency $2\Delta f$ and applied to the input of the circuit $M_1$. It should be mentioned that as compared with the circuit $M_1$ in the first embodiment of the invention (FIG. 1) the two quadrature modulators $m_1$ and $n_1$ have been omitted and that consequently the diagram 8a now also represents the spectrum of a complex signal $X_1$ the real component $C_1$ and the imaginary component $D_1$ of which are obtained in the branched $p_1$ and $q_1$ respectively of the circuit $M_1$. As in the previous embodiment, the samples of the real component $C_1$ have the frequency $\Delta f$ and the cosine spectrum of this component has the form shown in diagram 8d. The samples of the imaginary component $D_1$ also have the frequency $\Delta f$ and the sine spectrum of this component has the form shown in diagram 8e. Finally, as in the preceding embodiment, the circuit $r_1$ produces a delay equal to 4T to ensure that the samples of the real and imaginary components appear simultaneously at the outputs of the branches $p_1$ and $q_1$.

In the same manner, at the outputs of the circuits $M_2$ and $M_3$ pairs of digital signals are obtained which correspond to complex signals $X_2$ and $X_3$ the spectra of which are shown by diagram 8b for the output $M_2$ and by diagram 8c for the output of $M_3$. The spectra of the real components $C_2$ and $C_3$ and of the imaginary components $D_2$ and $D_3$ of these complex signals have shapes similar to those shown in diagrams 8d and 8e.

If the complex signals $X_1$, $X_2$ and $X_3$ supplied by the modulators $M_1$, $M_2$ and $M_3$ respectively are subjected to filtering operations according to attenuation characteristics $F_1$, $F_2$ and $F_3$ shown in the diagrams 8a, 8b and 8c respectively, it will be clear that by combining the signals filtered in this manner a multiplex signal is obtained the spectrum of which is shown by diagram 8f and extends between $\Delta f$ and $4\Delta f$ and also satisfies the requirement that its lowest frequency is a multiple of $\Delta f$.

The filter characteristics $F_1$, $F_2$ and $F_3$ of the diagrams 8a, 8b and 8c respectively are derived from the base filter characteristic by frequency translations equal to $(2n+1)\Delta f/2$, where $n=1$, 2 and 3 for $F_1$, $F_2$ and $F_3$ respectively.

These frequency translations, which are odd multiples of $\Delta f/2$, require that for processing the digital signals supplied by the circuits $M_1$, $M_2$ and $M_3$ a Fourier transformation device 1 should be used which performs an odd discrete Fourier transformation. Using the same notation as used in the above formula (1) in respect of an even Fourier transformation device, an odd Fourier transformation device at an output $v_i$ furnishes codewords given by the expression:

$$Re \sum_{n=0}^{3} X_n \cdot e^{j\frac{2\pi}{2N}\left(\frac{2n+1}{2}\right)_i} \qquad (5)$$

When the complex e-power in formula (5) is given the form $$e^{j2\pi(2n+1)\frac{\Delta f}{2} \cdot \frac{i}{2N\Delta f}}$$

it will be seen that it represents carrier signals having frequencies $(2n+1)\Delta f/2$ which correspond to the frequency translations of the base filter required to obtain the filtering characteristics $F_1$, $F_2$ and $F_3$.

With respect to the embodiment of an odd Fourier transformation device we refer to the aforementioned article by J. L. Vernet.

In the same manner as used hereinbefore it can be shown that in this second embodiment the processing of real and imaginary components of the complex signals supplied by the circuits $M_1$, $M_2$ and $M_3$ can be combined in accordance with the circuit diagram of FIG. 1 so as to use a Fourier transformation device 1, two sets of arithmetic units 3 and 17 and one series-parallel converter 5. It can be shown that in order to realise the filtering functions $F_1$, $F_2$ and $F_3$ by means of an odd Fourier transformation device it is necessary for the sets of coefficients supplied to the arithmetic units to be obtained by inverting the sign of one of each two consecutive coefficients in the sets of coefficients which correspond to the first embodiment. Also in this second embodiment it is of advantage to choose a symmetrical impulse response of the base filter for combining the sets of arithmetic units 3 and 17 of FIG. 1 according to the circuit diagrams shown in FIGS. 5 and 6.

This second embodiment of the invention permits obtaining at the output of the low-pass filter 8 a multiplex signal the lowest frequency of which is a multiple of the bandwidth $\Delta f$ of a channel signal. As has been stated, in order to place this multiplex signal in its ultimate band it may be caused in the modulator 9 to modulate a carrier wave which is a multiple of $\Delta f$ and does not give rise to indesirable components at the center of a channel. Alternatively, however, this latter modulation may be dispensed with the multiplex signal may directly be obtained in its ultimate band at the output of a low-pass filter 8. In actual fact, the spectrum of the analog signal at the output of the converter 7 includes the spectrum of the multiplex signal in the two sidebands lying on either side of each multiple of the sampling frequency 8Δf. One of these sidebands may coincide with the ultimate band of the multiplex signal and may therefore be selected by a low-pass filter 8. For example, with a sampling frequency of 112 kHz at the output of the converter 5 a multiplex signal of 12 speach channels situated in the standard band of 60 to 108 kHz may directly be obtained at the output of the filter 8.

So far the use of the system according to the invention for forming a single-sideband frequency-division multiplex signal from base-band channel signals has been described. Like the system according to prior U.S. Pat. No. 3,891,803 the present system may also be used for conversion in the opposite direction, i.e. for demultiplexing the said multiplex signal so that the signals in the various channels of the multiplex signal are obtained in the base band. To a person skilled in the art it will be clear that for performing the said demultiplexing operation it is only necessary to use, in the opposite direction, a system which is similar to that described and is provided with elements for performing operation which are the inverse of those described. Obviously, for the demultiplexing operation either of the embodiments described may be used.

Figure 9:
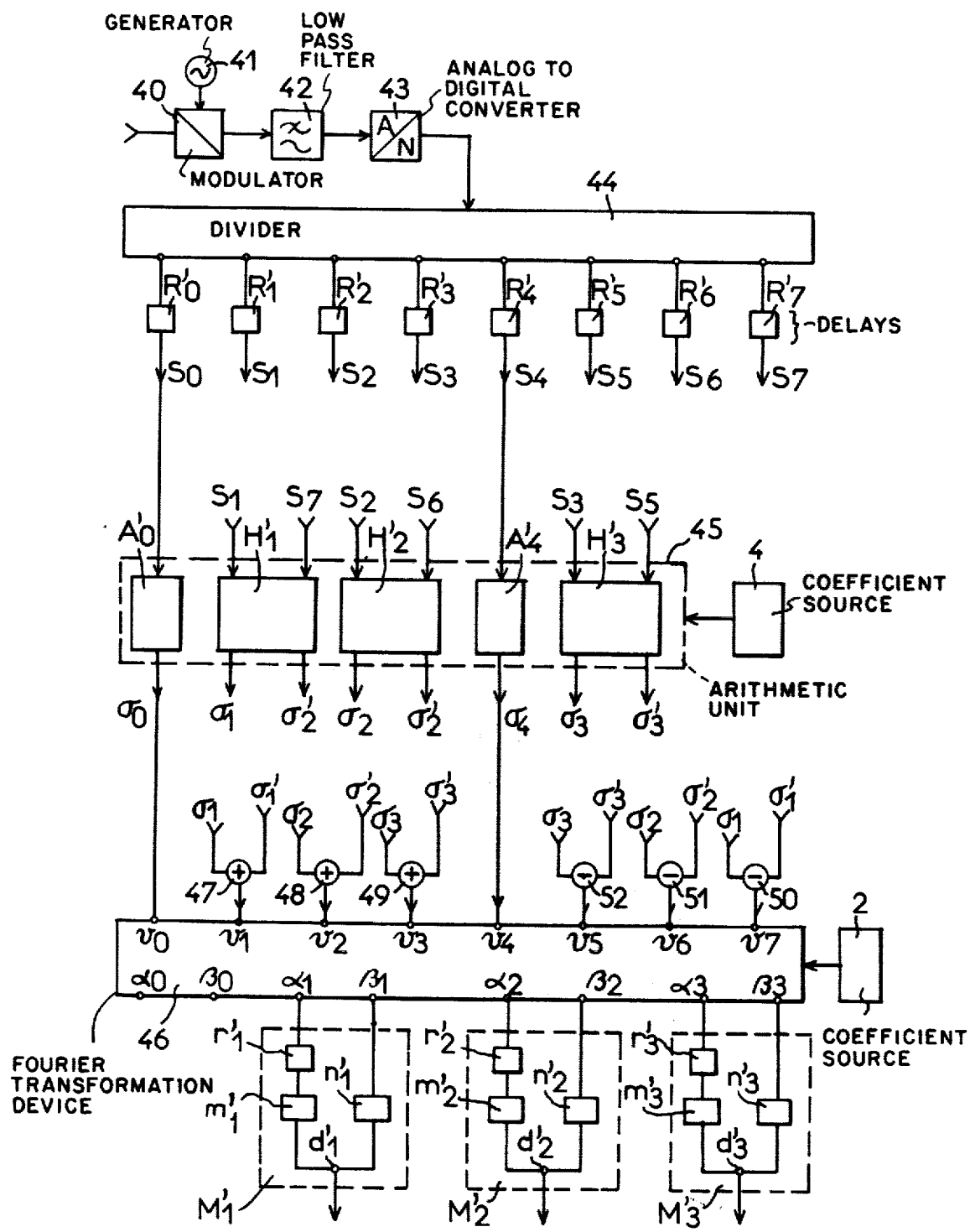
FIG. 9 is a schematic diagram of the system according to the invention used for demultiplexing the multiplex signal.

FIG. 9 is a block-schematic diagram of the system according to the invention when demultiplexing a frequency-division multiplex signal. This circuit diagram can readily be derived from that shown in FIG. 1 with a reversed transmission direction for the signals. Furthermore in FIG. 9 the two sets 3 and 17 of arithmetic units have been combined according to a circuit diagram similar to that shown in FIG. 5 which corresponds to using a symmetrical impulse response of the base filter.

In FIG. 9 the multiplex signal to be processed, which is in analog form, is applied to a modulator 40 which when energized by a carrier signal supplied by a generator 41 translates the multiplex signal to the low frequencies. Hereinafter the first modification of the system will be described by way of example in which the lowest frequency of the translated multiplex signal is an odd multiple of Δf/2. The spectrum of the analog signal at the output of the low-pass filter 42 begins, for example, at a frequency Δf/2 and in the embodiment described hereinbefore occupies a bandwidth of 3Δf as shown in diagram 4h of FIG. 4. This signal is sampled at the Nyquist frequency 8Δf and is encoded in an analog-to-digital converter 43.

The codewords at the frequency 8Δf at the output of the converter 43 are applied to a divider 44 having 8 outputs to which are connected circuits $r'_0$ to $r'_7$ which produce delays of duration 0.7 T to T. At the outputs of these delay circuits $r'_0$ to $r'_7$ the codewords $S_0$ to $S_7$ respectively appear simultaneously at the frequency Δf.

The codewords $S_0$ to $S_7$ are supplied to a set of arithmetic units 45 which receive the coefficients of the base filter having a symmetrical impulse response from the source 4. The set 45 has the same construction as the set 27 shown in FIG. 5 and comprises arithmetic units $A'_0$ and $A'_7$ and devices $H'_1$ $H'_2$ and $H'_3$ which are similar to the corresponding devices shown in FIG. 5.

The codewords $\sigma_0$ to $\sigma_4$ and $\sigma'_1$ to $\sigma'_3$ produced by the set 45 are used directly or in combination to form the codewords which are applied to inputs $v_0$ to $v_7$ of a Fourier transformation device 46. In the case of the first embodiment the said device performs an even inverse Fourier transformation and receives the suitable coefficients from a source 2. The codewords $\sigma_0$ and $\sigma_4$ supplied by the arithmetic units $A'_0$ and $A'_4$ respectively form the codewords which are applied to the inputs $v_0$ and $v_4$ respectively of the Fourier transformation device 46. The codewords $(\sigma_1, \sigma'_1)$, $(\sigma_2, \sigma'_2)$ and $(\sigma_3, \sigma'_3)$ supplied by the arithmetic units $H'_1$, $H'_2$ and $H'_3$ respectively are added in circuits 47, 48 and 49 and subtracted in circuits 50, 51 and 52 respectively. The outputs of the circuits 47, 48 and 49 are connected to inputs $v_1$, $v_2$ and $v_3$ of the Fourier transformation device 46 while the outputs of the circuits 50, 51 and 52 are connected to the corresponding symmetrical inputs $v_7$, $v_6$ and $v_5$ respectively.

At the pairs of outputs $(\alpha_1, \beta_1)$, $(\alpha_2, \beta_2)$ and $(\alpha_3, \beta_3)$ of the Fourier transformation device 46 the same pairs of digital signals are obtained as are applied to the pairs of inputs denoted by the same reference symbols of the transformation device 1 shown in FIG. 1, i.e. the real and imaginary parts of the complex signals $X_1$, $X_2$ and $X_3$ which are sampled at the frequency Δf with a shift of ½Δf=4T between the sampling instants of the real parts and the imaginary parts. However, just as in the case of FIG. 1 the samples of the real and imaginary parts are obtained simultaneously. Hence in the output circuits $M'_1$, $M'_2$ and $M'_3$ in the form of converters one of the branches includes a circuit $r'_1$, $r'_2$ and $r'_3$ respectively which produces a delay of 4T so as to obtain in the two branches of each circuit $M'_1$, $M'_2$ and $M'_3$ samples of the real and imaginary parts which are relatively shifted by 4T. The two branches of each circuit $M'_1$, $M'_2$ and $M'_3$ are then combined at a junction point $d'_1$, $d'_2$ and $d'_3$ via quadrature modulators $(m'_1, n'_1)$, $(m'_2, n'_2)$ and $(m'_3, n'_3)$ respectively. At the junctions $d'_1$, $d'_2$ and $d'_3$ the three channel signals of the input multiplex signal sampled at the Nyquist frequency 2Δf are separately obtained.

What is claimed is:

1. An arrangement for converting a number of real digital base band channel signals each being constituted by a succession of components at a rate 2Δf, into a digital single sideband frequency-division multiplex signal, comprising:

input circuit means comprising:

a first and a second branch, each having an input and an output, one of said branches including a delay circuit;

means for selectively applying the components of the digital channel signal applied to said input circuit means to the input of said first and to the input of said second branch, to produce pairs of digital signals;

a Fourier transformation device which is provided with N pairs of inputs and with 2 N outputs, where N is at least equal to the number of base band channel signals, and wherein said outputs being symmetrical; means for applying said pairs of digital signals to selected ones of said N pairs of inputs of said Fourier transformation device;

a first coefficient source which supplies carrier signal functions to said Fourier transformation device;

a plurality of at least N−1 addition circuits, each receiving symmetrical outputs of said Fourier transformation device and producing sum signals $\sigma_k$ wherein k = 1, 2, ... N−1;

a plurality of at least N−1 subtraction circuits, each receiving symmetrical outputs of said Fourier transformation device and producing difference signals $\sigma'_k$;

a plurality of first digital low pass filters $A_i$ wherein i=1, 2, ... 2N−1, producing first filter output signals $s_i$ in response to filter input signals, the sum signals $\sigma_k$ acting as filter input signals for the low pass filters $A_k$ and $A_{2N-k}$; a plurality of second digital low pass filters $B_i$ wherein i=1, 2, ... 2N−1, producing second filter output signals $s'_i$ in response to filter input signals, the difference signals $\sigma'_k$ acting as filter input signals for the low pass filters $B_k$ and $B_{2N-k}$;

means for summing first and second filter output signals to produce digital auxiliary sum signals $S_i = s_i + s'_i$;

a parallel to series converter having at least 2 N parallel arranged inputs which are adapted to receive the auxiliary sum signals $S_i$ for producing an output digital signal which is an interleaved version of the said digital auxiliary sum signals $S_i$ and which corresponds to the desired multiplex signal; a second coefficient source which supplies a set of filter coefficients a(q) wherein q = −2NP, −2NP+1, ... −1,0,1,2, ... 2NP−1 and wherein P is some positive integer, said filter coefficients a(q) defining samples of the impulse response of a low pass filter having a cutoff frequency which is equal to $\Delta f/2$, said samples being taken at a rate 2N $\Delta f$, the filter coefficients a(i−2Nr) wherein r = −P, −P+1, ... −1, 0, 1, 2, ... P−1, of said set of filter coefficients being applied to the low pass filters $A_i$ and $B_{(N+i)\ modulo\ 2N}$.

2. The system as claimed in claim 1 wherein said two branches of each input circuit comprise:

means by which carrier signals having a frequency equal to one-half of the frequency of the channel signal are caused to modulate in quadrature the digital signals in said branches, the Fourier transformation device receiving coefficients which correspond to carrier signal frequencies which are even multiples of the cutoff frequency of said lowpass filter for performing an even Fourier transformation.

3. The system as claimed in claim 1 wherein:

said Fourier transformation device receives coefficients which correspond to carrier signal frequencies which are odd multiples of a cutoff frequency of said lowpass filter for performing an odd Fourier transformation, while the sets of coefficients supplied to said arithmetic units are obtained from said sets of coefficients by inverting the sign of one of each of two consecutive coefficients of each set.

4. The system as claimed in claim 1 wherein:

said lowpass filter has an impulse response having a symmetry axis; and in said two sets of arithmetic units the pairs of corresponding arithmetic units are combined so that the arithmetic units of each pair use the same multiplying devices in the arithmetic unit and said two pairs use the same delay circuits.

5. An arrangement for converting a digital single side-band frequency-division multiplex signal into corresponding real digital base band channel signals, said digital single sideband frequency-division multiplex signal being constituted by a succession of components occurring at a rate 2N $\Delta f$ and said digital base band channel signals being constituted by a succession of components occurring at a rate 2 $\Delta f$, wherein $\Delta f$ is at least equal to the bandwidth of the channel signals and N is at least equal to the number of channel signals, said arrangement comprising:

a series to parallel converter having applied thereto said multiplex signal and having 2 N parallel arranged output paths, this converter being arranged for distributing the components of the multiplex signal in a cyclical manner over the output paths to produce digital auxilliary signals $S_i$ wherein i=1, 2, ... 2N−1;

a plurality of first digital lowpass filters $A_i$ producing first filter output signals $s_i$ in response to the digital auxiliary signals $S_i$ applied thereto; a plurality of second digital lowpass filters $B_i$ producing second filter output signals $s'_i$ applied thereto;

a first coefficient source which supplies a set of filter coefficients a(q) wherein q = −2NP, −2NP+1, ... −1,0,1,2, ... 2NP−1 and wherein P is some positive integer, said filter coefficients a(q) defining samples of the impulse response of a lowpass filter having a cutoff frequency which is equal to $\Delta f/2$, said samples being taken at a rate 2N$\Delta f$, the filter coefficients a(i+2Nr) wherein r = −P, −P+1, ... −1,0,1,2, ... P−1, of said set of filter coefficients being applied to the lowpass filters $A_i$ and $B_{(N+i)\ mod\ 2N}$;

a plurality of at least N−1 first subtraction circuits producing first difference signals $\sigma'_k$ wherein k=1,2, ... N−1 in response to the second filter output signals $s'_k$ and $s'_{2N-k}$ applied thereto; a plurality of at least N−1 first addition circuits producing first sum signals $\sigma_k$ in response to the first filter output signals $s_k$ and $s_{2N-k}$ applied thereto;

a plurality of at least N−1 second addition circuits producing second sum signals $v_k$ in response to the first sum signals $\sigma_k$ and the first difference signals $\sigma'_k$ applied thereto;

a plurality of at least N−1 second subtraction circuits producing second difference signals $v_{2N-k}$ in response to the first sum signals $\sigma_k$ and the first difference signals $\sigma'_k$ applied thereto;

a Fourier transformation device which is provided with 2 N inputs and with N pairs of outputs, wherein said inputs being symmetrical;

means for applying the second sum signals $V_k$ and the second difference signals $V_{2N-k}$ to symmetrical inputs of said Fourier transformation device, to produce in response thereto pairs of digital signals; a second coefficient source which supplies carrier signal functions to said Fourier transformation device;

an output circuit comprising:

a first and a second branch, each having an input and an output, one of said branches including a delay circuit;

means for applying selected ones of said N pairs of digital signals produced by said Fourier transformation device to said branches;

said output circuit having an output;

means for selectively connecting the outputs of said first and second branch to the said output circuit output to produce the desired base band channel signal.

* * * * *